United States Patent
Zamora et al.

(10) Patent No.: US 6,404,621 B2
(45) Date of Patent: Jun. 11, 2002

(54) LAPTOP COMPUTER WITH ERGONOMICALLY ENHANCED INTERFACE FEATURES

(75) Inventors: George G. Zamora, Vail; Daniel James Winarski, Tucson, both of AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/824,170

(22) Filed: Apr. 2, 2001

Related U.S. Application Data

(62) Division of application No. 09/414,188, filed on Oct. 7, 1999.

(51) Int. Cl.[7] .............................. H05K 5/02; H05K 5/03
(52) U.S. Cl. ...................... 361/680; 361/681; 361/683; 361/686; 312/208.4; 345/168
(58) Field of Search ................................ 361/680–683, 361/686, 724–727; 400/472, 473, 477, 479, 488, 489, 492; 341/21, 22; 312/208.1, 208.4; D14/247; D18/1, 7, 52; 345/168, 169; 348/794

(56) References Cited

U.S. PATENT DOCUMENTS

| | | | | |
|---|---|---|---|---|
| 4,527,149 A | * | 7/1985 | Swensen | 340/365 R |
| 4,550,221 A | * | 10/1985 | Mabusth | 178/18 |
| 4,568,056 A | * | 2/1986 | Lewinski | 248/677 |
| 5,067,834 A | * | 11/1991 | Szmanda et al. | 400/489 |
| 5,168,427 A | * | 12/1992 | Clancy et al. | 361/393 |
| 5,198,991 A | | 3/1993 | Pollitt | |
| 5,200,883 A | * | 4/1993 | Kobayashi | 361/395 |
| 5,228,791 A | * | 7/1993 | Fort | 400/489 |
| 5,267,127 A | | 11/1993 | Pollitt | |
| 5,347,630 A | * | 9/1994 | Ishizawa et al. | 395/164 |
| 5,375,800 A | * | 12/1994 | Wilcox et al. | 248/118.1 |
| 5,397,189 A | * | 3/1995 | Minogue | 400/489 |
| 5,490,036 A | * | 2/1996 | Lin et al. | 361/680 |
| 5,539,615 A | * | 7/1996 | Sellers | 361/680 |
| 5,575,576 A | | 11/1996 | Roysden, Jr. | |
| 5,613,786 A | * | 3/1997 | Howell et al. | 400/489 |
| 5,706,167 A | | 1/1998 | Lee | |
| 5,717,431 A | * | 2/1998 | Chia-Ying et al. | 345/168 |
| 5,729,480 A | * | 3/1998 | Katoh et al. | 364/709.12 |
| 5,734,548 A | | 3/1998 | Park | |
| 5,748,185 A | * | 5/1998 | Stephan et al. | 345/173 |
| 5,754,395 A | | 5/1998 | Hsu et al. | |
| 5,764,474 A | * | 6/1998 | Youens | 361/680 |

(List continued on next page.)

FOREIGN PATENT DOCUMENTS

| | | | | |
|---|---|---|---|---|
| JP | 4-281509 | * | 10/1992 | G06F/1/16 |
| JP | 7-72954 | * | 3/1995 | G06F/1/16 |
| JP | 8-22350 | * | 1/1996 | G06F/3/02 |
| JP | 11-184604 | * | 7/1999 | G06F/3/02 |

*Primary Examiner*—Anatoly Vortman
(74) *Attorney, Agent, or Firm*—Robert M. Sullivan; Bracewell & Patterson, L.L.P.

(57) ABSTRACT

A laptop computer has a base and a cover with a display monitor that are connected together by a hinge. The base and cover have congruent trapezoidal shapes that give the laptop a unique appearance. A pair of segregated right and left keyboards are mounted to the base. Each keyboard is rotated by a small angle from the center of the base to align with the natural position of the arms of the user. The keyboards are further articulated such that their front ends are elevated relative to their rearward ends. Alternate embodiments of the invention utilize various mechanisms for articulating the keyboards. In addition, the keys on each keyboard may be arranged in a curvilinear formation. The laptop has a wedge that is slidably mounted to the rearward end of the base for varying the angle of inclination of the keyboards. The wedge can raise or lower the angle of the keyboards to suit the preference of the user. The laptop also has a pair of touch pads with different sensitivities, as well as a track point or track ball for moving the screen cursor.

9 Claims, 5 Drawing Sheets

U.S. PATENT DOCUMENTS

| | | | |
|---|---|---|---|
| 5,769,551 A | | 6/1998 | Tsai et al. |
| 5,800,085 A | | 9/1998 | Lee |
| 5,818,360 A | * | 10/1998 | Chu et al. .................... 341/22 |
| 5,818,690 A | * | 10/1998 | Spencer .................... 361/680 |
| 5,856,822 A | * | 1/1999 | Du et al. .................... 345/145 |
| 5,918,957 A | * | 7/1999 | Bovio et al. ............. 312/223.2 |
| 5,949,643 A | * | 9/1999 | Batio .................... 361/681 |
| 5,990,872 A | * | 11/1999 | Jorgenson et al. .......... 345/168 |
| 6,008,986 A | * | 12/1999 | Mok .................... 361/687 |
| 6,028,768 A | * | 2/2000 | Cipolla .................... 361/687 |
| 6,081,207 A | * | 6/2000 | Batio .................... 341/20 |
| 6,091,600 A | * | 7/2000 | Jeong .................... 361/680 |

\* cited by examiner

LAPTOP COMPUTER WITH ERGONOMICALLY ENHANCED INTERFACE FEATURES

This is Division of application Ser. No. 09/414,188, filed Oct. 7, 1999, currently pending.

BACKGROUND OF THE INVENTION

1. Technical Field

This invention relates in general to portable computers and in particular to portable laptop computers with ergonomically enhanced keyboard and cursor control interface features.

2. Background Art

In the prior art, laptop computers have keyboards with substantially flat, linear arrays of keys. The keyboards sit square in front of the user and force the user to rotate his or her wrists to awkward, unnatural angles. Unfortunately, discomfort and even carpal tunnel carpal syndrome can develop in users of non-ergonomic keyboards that force the user to uncomfortably flex or rotate his or her wrists. The user's risk of carpal tunnel syndrome may be reduced by keeping the wrists straight. This problem has been especially difficult for laptop computer designers to overcome since laptops are portable and used in varying environments.

One prior art design attempted to alleviate the ergonomically incorrect angles by dividing the keyboard into left and right portions that move apart to a wider spacing when the cover or lid of the laptop was opened. However, this keyboard design remained substantially flat after it was deployed. Another prior art keyboard design exists for non-portable desktop computers, but it is a static design that cannot be collapsed for use with laptop computers. An improved keyboard for laptop computer applications is needed to enhance the ergonomic features of the computer to reduce the risk of carpal tunnel syndrome.

SUMMARY OF THE INVENTION

A laptop computer has a base and a cover with a display monitor that are connected together by a hinge. The base and cover have congruent trapezoidal shapes that give the laptop a unique appearance. A pair of segregated right and left keyboards are mounted to the base. Each keyboard is rotated by a small angle from the center of the base to align with the natural position of the arms of the user. The keyboards are further articulated such that their front ends (nearest to the user) are elevated above or below relative to their rearward ends (nearest to the monitor). Alternate embodiments of the invention utilize various mechanisms for articulating the keyboards. In addition, the keys on each keyboard may be arranged in a curvilinear formation. The laptop has a wedge that is slidably mounted to the rearward end of the base for varying the angle of inclination of the keyboards. The wedge can raise or lower the keyboards to suit the preference of the user. The laptop also has a pair of touch pads with different sensitivities, as well as a track point for moving the screen cursor.

Thus, one object of the invention is to divide the keyboard into two halves to allow the user adjustable rotation of the keyboard halves to promote proper posture with straight or unbent wrists, thus providing an ergonomic laptop.

Another object of the invention is to provide adjustable rotation of the keyboard halves via preloaded flexures and a slidable wedge.

Still another object of the invention is to provide keyboard keys that are staggered in an arcuate pattern in order to conform to the natural curled position of the user's fingers.

Still another object of the invention is to provide a laptop computer with a nonconventional profile that is distinctive and appeals to users.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

BEST MODE FOR CARRYING OUT THE INVENTION

Figure 1:
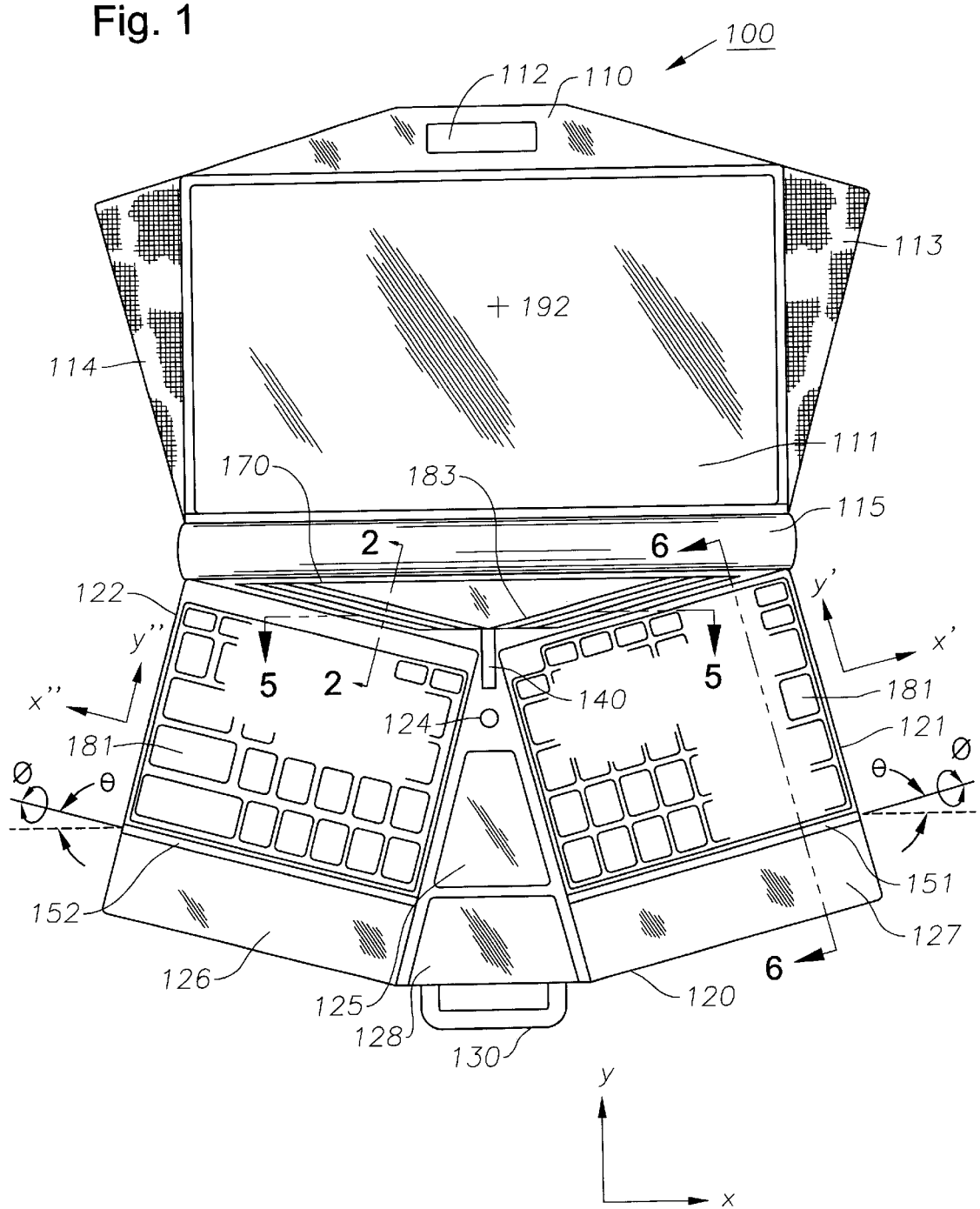
FIG. 1 is a top view of a first embodiment of a laptop computer constructed in accordance with the invention.

Referring to FIG. 1, a first embodiment of a laptop computer 100 constructed in accordance with the invention is shown. Laptop 100 has a lid or upper half 110 and a base or lower half 120 that are connected together by a hinge 115. Hinge 115 allows the upper half 110 and lower half 120 to rotate relative to each other in a clamshell-like fashion about the X-axis. Laptop 100 is shown in the open position but can be moved to a closed position (not shown) to reduce its size and protect its delicate mechanisms when not in use.

Upper half 110 has a rectangular output display screen 111 for displaying output information to the user. Screen 111 is preferably a liquid crystal display (LCD), but it could use other technologies such as organic light emitting diodes (OLED). Upper half 110 also has a rectangular date and time clock 112 located above screen 111, and triangular right and left speakers 113, 114 located on the lateral sides of screen 111. Note the unique polygonal shape of upper half 110 compared to conventional rectangular-shaped laptop covers or lids.

Lower half 120 has a pair of segregated right and left keyboards 121, 122 with a plurality of keys 181 for data input to laptop 100. When viewed from above, keyboard 121 is rotated by a small positive angle THETA (counterclockwise) about the Z-axis from the X-axis. An new coordinate system is defined by keyboard 121 with an X'-axis and a Y'-axis. Similarly, keyboard 122 is rotated clockwise by the same angle THETA in the opposite direction about the Z-axis from the negative X-axis. A coordinate system with an X"-axis and Y"-axis is defined by keyboard 122. Note that keyboards 121, 122 are fixed in the trapezoidal configuration shown to match the profile or shape of upper half 110.

The range for the angle THETA is approximately 5 to 20 degrees, with a preferred value of 12.5 degrees. Keyboards 121, 122 are rotatably connected to lower half 120 by elements 151, 152, respectively. Elements 151, 152 allow an angle of twist PHI relative to their respective X'-axis and X"-axis. In the preferred embodiment, elements 151, 152 are flexures made from spring steel that are preloaded to hold keyboards 121, 122 down against lower half 120.

Figure 2:
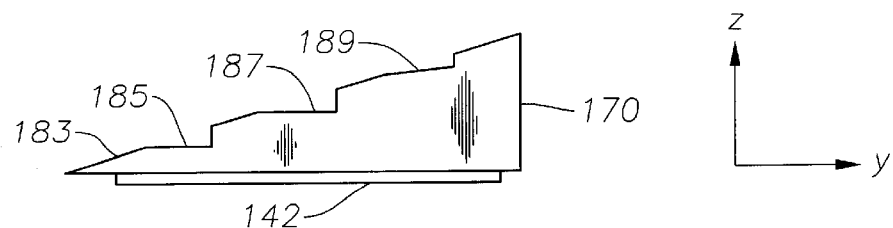
FIG. 2 is a side view of an elevation wedge for the computer of FIG. 1 taken along the line 2—2 of FIG. 1.
Figure 5:
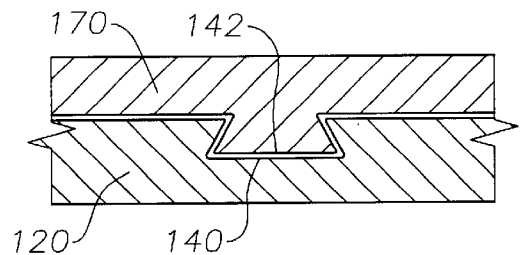
FIG. 5 is a front sectional view of a lower portion of the wedge and computer of FIGS. 1 and 2 taken along the line 5—5 of FIG. 1.
Figure 6:
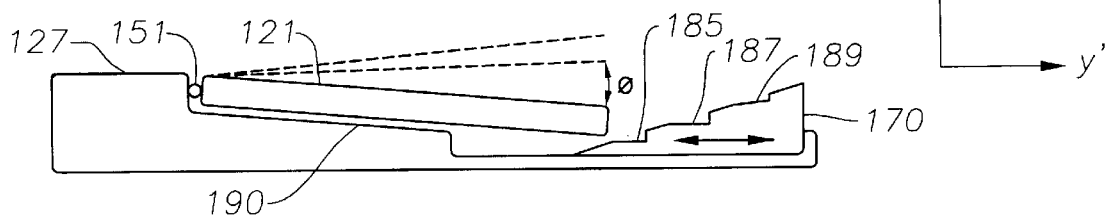
FIG. 6 is a schematic side view of the computer and wedge of FIGS. 1 and 2 in operation taken along the line 6—6 of FIG. 1.

As shown in FIGS. 1, 2, and 6, a wedge 170 is mounted to lower half 120 and is slidable relative thereto along a slot 140 that is parallel to the Y-axis. Wedge 170 is coupled to slot 140 with a dovetail 142 (FIG. 5). Dovetail 142 allows precision sliding motion of wedge 170 in the +/−Y direction and keeps wedge 170 attached to lower half 120. Wedge 170 is used to elevate or lower the forward ends of keyboards 121, 122 to suit the preference of the user. If the user desires to have laptop 100 in a low position, the keyboards 121, 122 will be more comfortable to use in a declined position (FIG. 6). Hence, wedge 170 would be moved in the +Y direction. However, if laptop 100 is elevated relative to the user, keyboards 121, 122 would be more comfortable in an inclined position. so wedge 170 is would be moved in the −Y direction.

As shown in FIGS. 1 and 2, wedge 170 has an inclined ramp 183 which is piecewise continuous. A plurality of slots 185, 187, 189 are cut into ramp 183 to allow precise and repeatable angulation of keyboards 121 and 122. However, the user would be free to set wedge 170 at other angles PHI. At the base of wedge 170 dovetail 142 keys the motion of wedge 170 in slot 140. It is preferred that PHI have a range of −10 degrees to +10 degrees. When the wedge is fully disengaged, PHI would be −10 degrees and when the wedge is fully engaged, PHI would be +10 degrees. Thus, slots 185, 187, 189 would represent values of PHI of −5 degrees, 0 degrees or horizontal, and +5 degrees.

The unusual orientation of keyboards 121, 122 accommodates the anthropometric parameters of the human body. The shoulder-to-shoulder dimension of adults and older children is significantly wider than the width of a laptop keyboard. Thus, the conventional unitary keyboard employed by traditional laptops must be divided into two portions with each portion rotated by angle THETA in order to properly accommodate the shoulder-to-shoulder dimension of users. If the keyboard is not split and the portions are not rotated, the user must rotate his wrists to an uncomfortable angle to use the keyboard. Holding the wrists at uncomfortable angles for extended periods of time can lead to carpal tunnel syndrome, which can be painful and debilitating.

FIG. 6 shows flexure 151 connecting keypad 121 to wrist pad 127 of lower half 120. Surface 190 keeps keyboard 121 from depressing more than −10 degrees relative to the horizontal when wedge 170 is not engaged. Then, as wedge 170 is moved in the −Y direction, it increasingly lifts keyboard 121 up to +10 degrees relative to the horizontal. The preloading of flexure 151 keeps the keyboard flexed against the wedge 170, which holds the keyboard against the wedge and keeps the wedge from shifting under normal keystroke motion. Alternately, element 151 could be a spring-loaded hinge.

Lower half 120 also has wrist pads 126 and 127. In between wrist pads 126, 127 is an optional touch-pad 128. Similarly, in between keyboards 121 and 122 is an optional touch-pad 125. By running a finger along one touch-pad, the laptop user can direct a cursor 192 on screen 111. The availability of two touch-pads affords the user two levels of cursor sensitivity without having to continually readjust the sensitivity of the touch-pad in via the computer operating system. Thus, touch-pad 128 could have a coarse sensitivity for rapid and screen-wide motion and touch-pad 125 could have a fine sensitivity for precision motion of the cursor. Such dual-sensitivity pairs of touch pads could have value in computer graphic applications.

In between keyboards 121 and 122 is an optional cursor track point or track ball 124. Use of the track point 124, or either of touch pads 125, 128 replaces a computer mouse. Since a computer mouse is used externally to the laptop body, it typically requires additional desktop space and adds to the weight that the user of the laptop must carry. Hence, cursor track point 124, and touch pads 125 and 128, are offered as light weight, miniature alternatives to the computer mouse. Lower half 120 also has an optional handle 130 by which the user may carry laptop 100 when it is closed.

Figure 3:
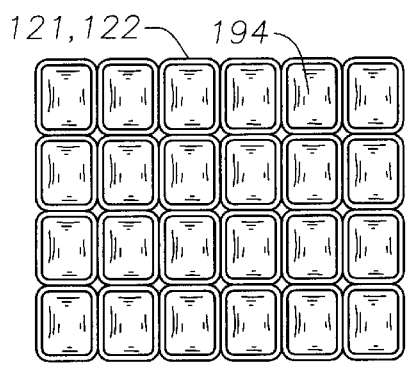
FIG. 3 is a schematic drawing of a rectilinear arrangement of keyboard keys for the computer of claim 1.
Figure 4:
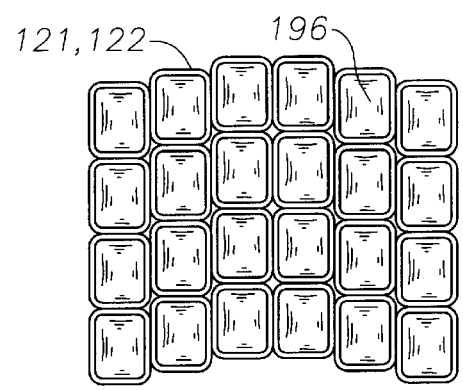
FIG. 4 is a schematic drawing of a curvilinear arrangement of keyboard keys for the computer of claim 1.

FIGS. 3 and 4 show two possible arrangements of the keys 181 in each of the keyboards 121, 122. FIG. 3 shows keys 194 in a rectilinear pattern commonly seen in all computer keyboards. However, since the fingers of the user are not all the same length, keys 196 (FIG. 4) are staggered to accommodate the natural length and arc of the user's fingers. In one embodiment, the individual keys are hexagonal in shape, rather than square or rectangular, to give the user a larger surface area for pushing the keys while maintaining a small keyboard profile.

Figure 7:
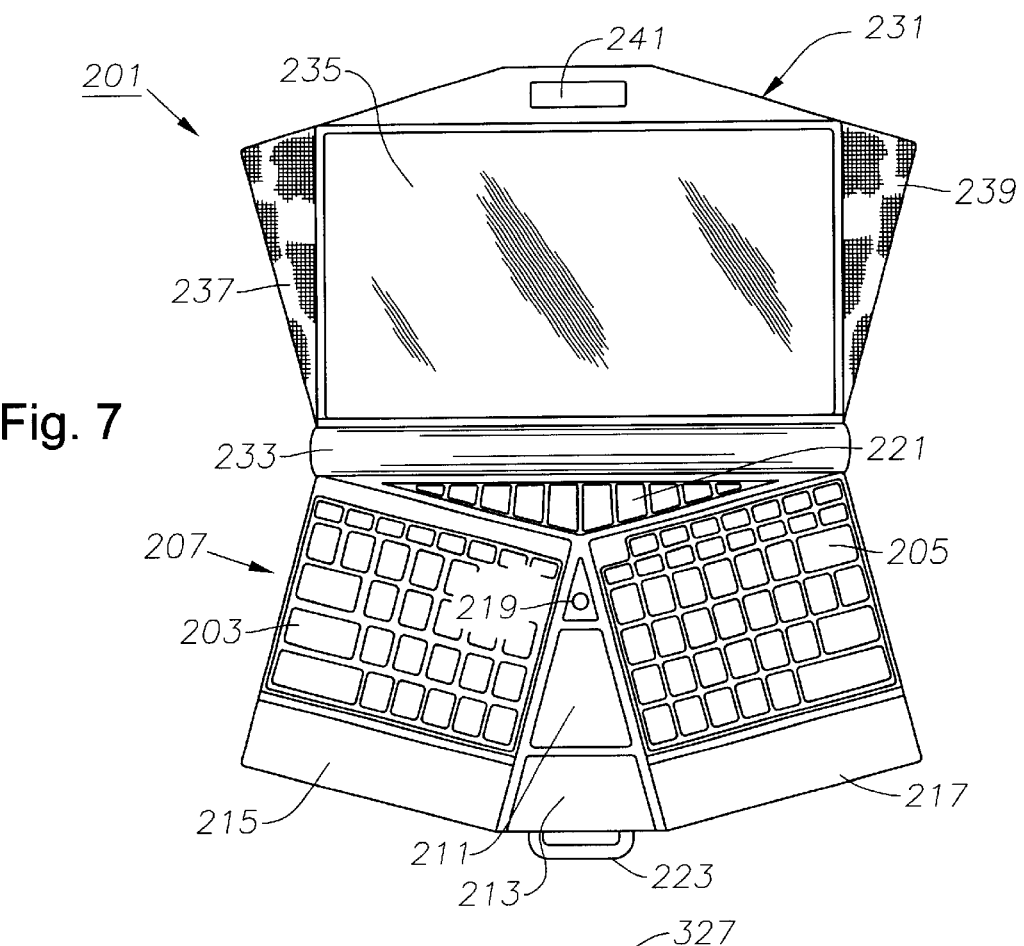
FIG. 7 is a top view of a second embodiment of the computer of FIG. 1.

Referring now to FIG. 7, a second embodiment of the invention is shown as laptop computer 201. Like laptop 100, laptop 201 is unconventional in shape by using trapezoidal features and skewed orientations, which distinguish its appearance from prior art designs and enhance its ergonomics. However, the keyboard portions 203, 205 of laptop 201 are fixed relative to its lower half 207 and are not movable except for the motion of the individual keys thereon. The keys on keyboard portions 203, 205 may be arranged in either of the patterns shown and described for FIGS. 3 and 4. Lower half 207 also has a pair of touch pads 211, 213, a pair of wrist pads 215, 217, a track point or track ball 219, a set of function keys 221 arranged in a triangular formation, and an optional handle 223. Function keys 221 are located between the rear end of lower half 207 and the rear ends of keyboard portions 203, 205. The other elements are described above and operate in a similar manner.

The upper half 231 of laptop 201 is pivotally mounted to lower half 207 on a hinge 233. Upper half 231 is similar to upper half 110 of laptop 100, including a rectangular display screen 235, a triangular speaker 237, 239 on each side lateral side of screen 235, and a date and time display 241 above screen 235. Note that the outer perimeter shape of upper half 231 perfectly matches that of lower half 207. Thus, when upper half 231 is pivoted to a closed position (not shown) about hinge 233, it forms a symmetrical, trapezoidal case with lower half 207.

Figure 8:
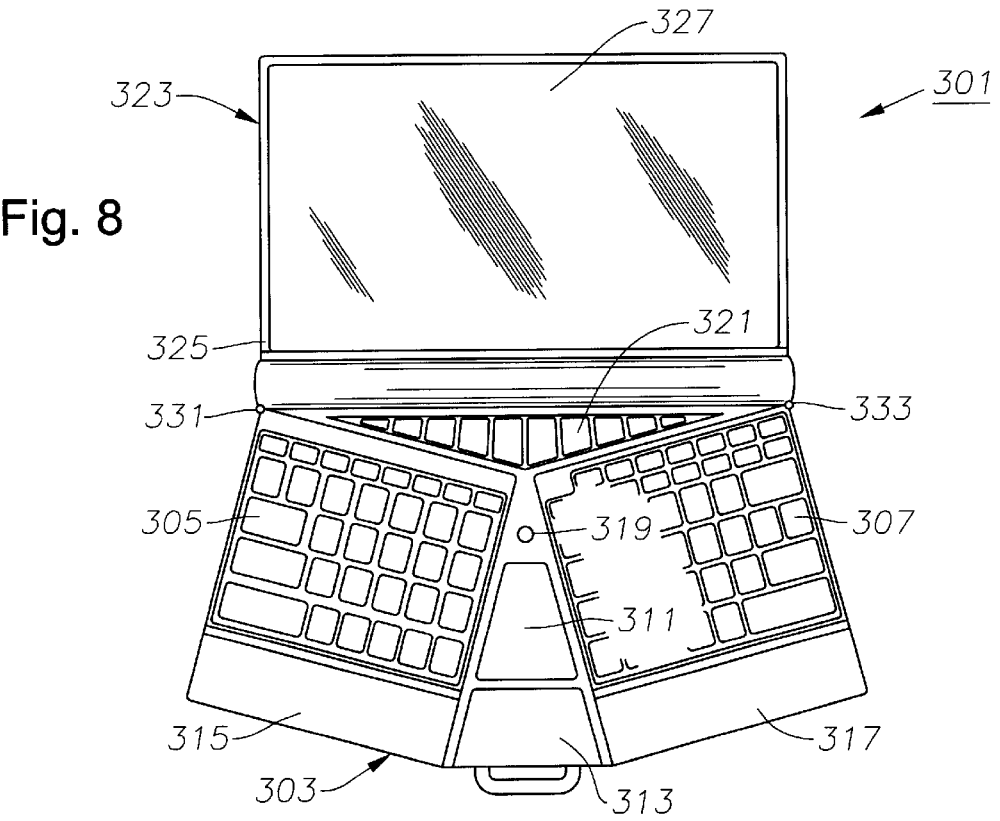
FIG. 8 is a top view of a third embodiment of the computer of FIG. 1.

Referring now to FIG. 8, a third embodiment of the invention is shown as laptop computer 301. Laptop 301 is somewhat of a hybrid between laptops 100 and 201. The lower half 303 of laptop 301 has all the features and functions of laptop 201, including keyboard portions 305, 307, touch pads 311, 313, wrist pads 315, 317, a track point or track ball 319, and a triangular set of function keys 321. The upper half 323 of laptop 301 is pivotally mounted to lower half 303 about a hinge 325, and has a rectangular profile including a display screen 327.

When in the open position (shown), lower half 303 also has the same trapezoidal shape as laptop 201. However, keyboard portions 305, 307 of laptop 301 are not fixed relative to lower half 303. Rather, they are pivotally mounted to lower half 303 at their outer rear edges 331, 333, respectively, so that laptop 301 can be collapsed into a conventional rectangular-shaped profile when upper half 323 is moved to the closed position (not shown) adjacent to lower half 303.

Figure 9:
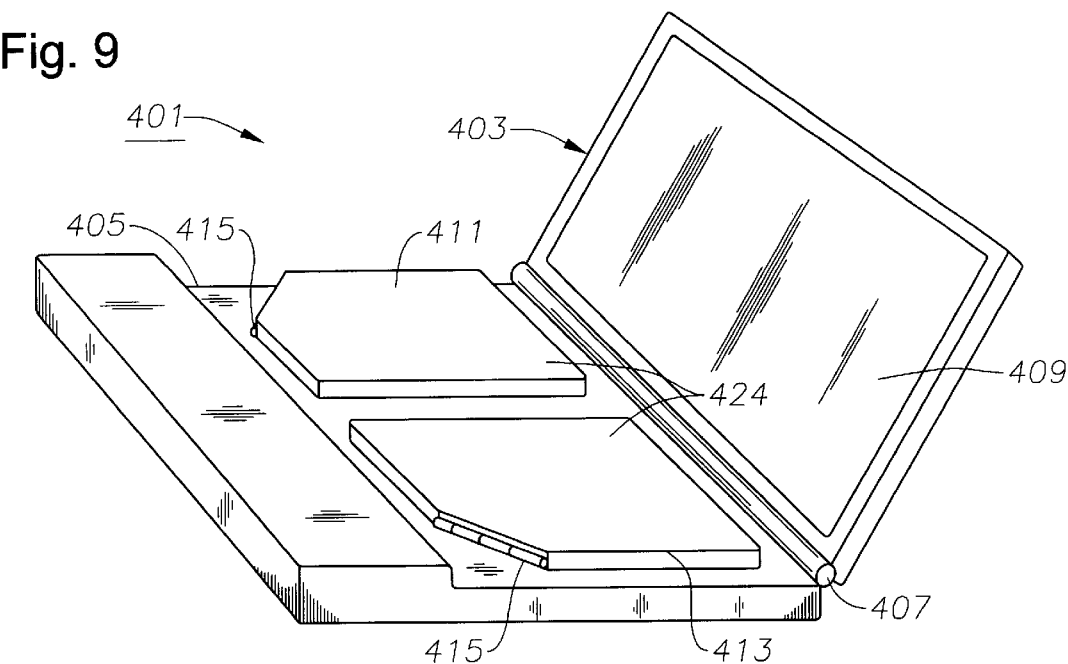
FIG. 9 is an isometric view of a fourth embodiment of the computer of FIG. 1.
Figure 10:
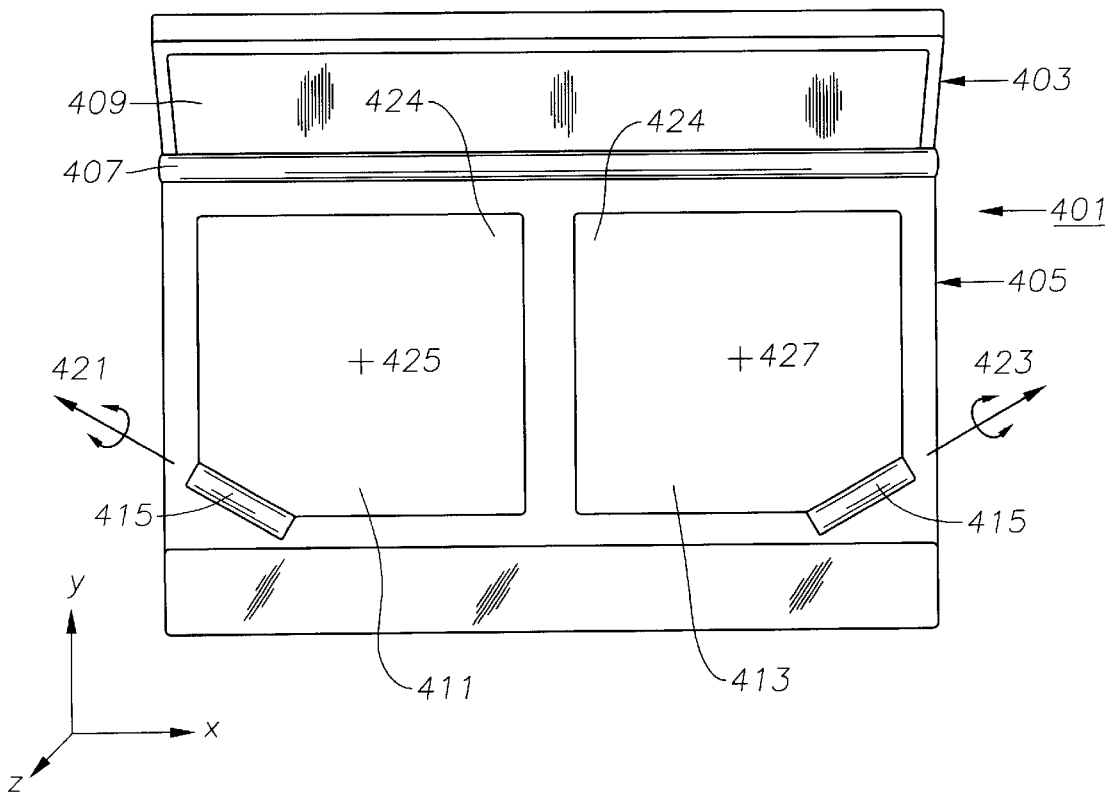
FIG. 10 is a top view of the computer of FIG. 9.

A fourth embodiment of the invention is shown in FIGS. 9 and 10. Laptop computer 401 has an upper half 403, a lower half 405 and a hinge 407 therebetween. Upper half 403 has a monitor 409 for displaying images. Lower half 405 has a pair of keyboard portions 411, 413 that are pivotally mounted thereto via pivot elements 415. Elements 415 are preferably leaf-spring flexures made of spring steel, but could also be hinges or other pivot mechanisms. Keyboard portions 411, 413 pivot about axes 421, 423, respectively. Each keyboard portion 411, 413 has a device 424 near its inner, rearward corner for assisting rotation about pivot elements 421, 423. In addition, keyboard portions 411, 413 may rotate or pivot to a desired position in a "lazy-susan" fashion about the Z-axis at points 425, 427, respectively. These two pivot capabilities of laptop 401 give the user greater ergonomic flexibility in adapting the keyboard portions 411, 413 to a proper fit. Thus, keyboard portions 411, 413 are movable to various positions such as those depicted in the previous figures.

The remaining embodiments of the invention disclosed in FIGS. 11–19, illustrate alternate mechanisms for elevating the front edge(s) of the keyboard or keyboard portions (those located nearest to the user). These mechanisms may be employed with conventional designs or any of the designs previously described herein and, thus, should not be limited to the laptop computers designs that appear in the drawings.

Figure 11:
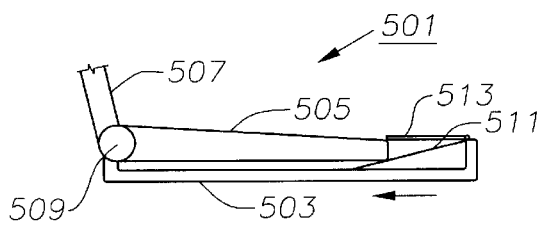
FIG. 11 is a schematic side view of a fifth embodiment of the computer and wedge of FIGS. 1 and 2 at a nominal position
Figure 12:
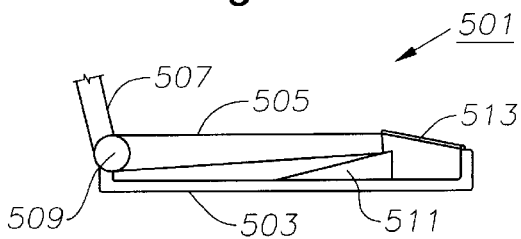
FIG. 12 is a schematic side view of the computer of FIG. 11 at an elevated position.

Referring now to FIGS. 11 and 12, laptop computer 501 is the fifth embodiment of the invention. Laptop 501 has a stationary base 503 with a keyboard portion 505, and a lid 507 containing a display monitor. Lid 507 is pivotally mounted to the rearward end of base 503 with a hinge 509. A triangular wedge 511 is slidably mounted near the front end of base 503. Wedge 511 has an inclined surface for engaging the front end of keyboard portion 505. A pivotal cover 513 extends between the front end of base 503 and the front end of keyboard portion 505. When wedge 511 is in the disengaged position (FIG. 11), keyboard portion 505 and cover 513 are substantially horizontal in a conventional configuration. However, when wedge 511 is moved rearward to the engaged position (FIG. 12), the rear end of keyboard portion 505 is elevated higher than its rearward end at hinge 509 to form a more ergonomically correct configuration. Cover 513 pivots with keyboard portion 505, but is inclined in the opposite direction.

Figure 13:
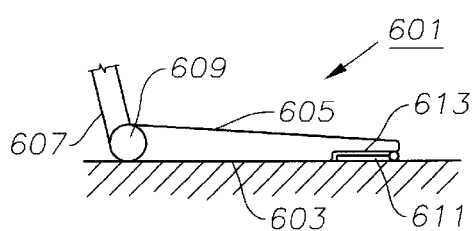
FIG. 13 is a schematic side view of a sixth embodiment of the computer and wedge of FIGS. 1 and 2 at a nominal position.
Figure 14:
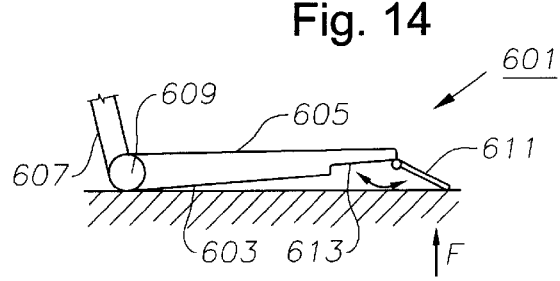
FIG. 14 is a schematic side view of the computer of FIG. 13 at an elevated position.

As shown in FIGS. 13 and 14, the sixth embodiment of the invention is illustrated as laptop computer 601. Laptop 601 has a base 603 with a built-in keyboard 605 on its upper surface, and a pivotal lid 607 with a display monitor mounted to the rearward end of base 603 with a hinge 609. A pivotal leg 611 is hingably mounted to the lower surface of base 603 near its front end. Leg 611 is substantially flat and locates in a recess 613 when it is in its collapsed position (FIG. 13). When leg 611 is in the collapsed position, keyboard 605 is substantially horizontal. However, when leg 611 is flipped out to its deployed position in front of base 603 (FIG. 14), the rear end of keyboard 605 is elevated higher than its rearward end at hinge 609 to form a more ergonomically correct configuration. The arcuate range of motion of leg 611 is limited to the diagonal alignment shown to prevent its overextension. The weight of laptop 601 keeps leg 611 in its deployed position until it is retracted by the user.

Figure 15:
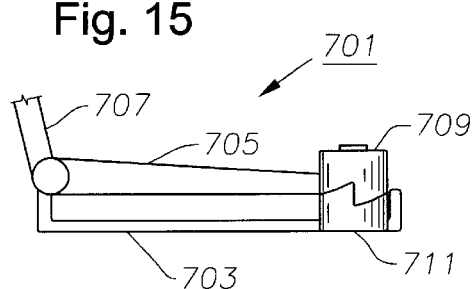
FIG. 15 is a schematic side view of a seventh embodiment of the computer and wedge of FIGS. 1 and 2 at a nominal position.
Figure 16:
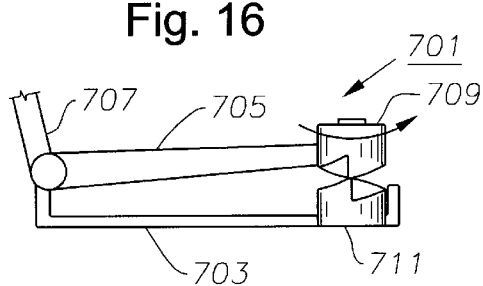
FIG. 16 is a schematic side view of the computer of FIG. 15 at an elevated position.

Referring now to FIGS. 15 and 16, laptop computer 701 is the seventh embodiment of the invention. Laptop 701 has a stationary base 703 with a keyboard 705, and a pivotal lid 707 containing a display monitor. Laptop 701 also has upper and lower cylindrical wedges or cam members 709, 711 at its front end. Upper cam member 709 is mounted to keyboard 705 and lower cam member 711 is mounted to base 703. Cam members 709, 711 slidably engage each other along mating inclined cam surfaces that are semi-helical in nature. When cam members 709, 711 are in their retracted position (FIG. 15), keyboard portion 705 is substantially horizontal. However, when cam member 709 is rotated to the deployed position (FIG. 16), the rear end of keyboard portion 705 is elevated higher than its rearward end. Rotating cam member 709 in the opposite direction collapses laptop 701 back to the retracted position.

Figure 17:
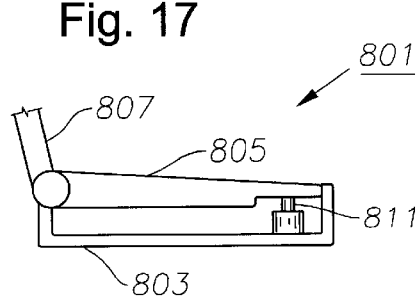
FIG. 17 is a schematic side view of an eighth embodiment of the computer and wedge of FIGS. 1 and 2 at a nominal position.
Figure 18:
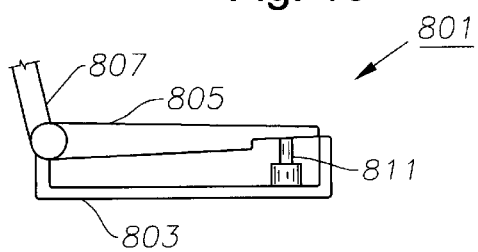
FIG. 18 is a schematic side view of the computer of FIG. 17 at an elevated position.

As shown in FIGS. 17 and 18, the eighth embodiment of the invention is illustrated as laptop computer 801. Laptop 801 has a base 803 with a keyboard 805 on its upper surface, and a pivotal lid 807 with a display monitor. A plunger 811 having base and elevation elements is mounted to base 803 and the lower surface of keyboard 805, respectively, near their front ends. When plunger 811 is in its lower or collapsed position (FIG. 17), keyboard 805 is substantially horizontal. However, when plunger 811 is "clicked" to its raised or deployed position (FIG. 18), the rear end of keyboard 805 is elevated higher than its rearward end to form a more ergonomically correct configuration. Plunger 811 may be configured to have a variety of settings and, thus, the elevation of keyboard 805 may be adjusted according to need. Laptop 801 may be returned to its original collapsed position by releasing plunger 811.

The invention has several advantages. The keyboard portions are divided and configured to maximize the user's ergonomic comfort while minimizing the risk of carpal tunnel syndrome. The keyboards can be angled to align with the user's arms and wrists, and the keys can be arranged in a curvilinear formation in order to contour to the length of the user's fingers. In addition, the polygonal or trapezoidal shapes of the various embodiments give the laptops a distinctive appearance.

While the invention has been shown or described in only some of its forms, it should be apparent to those skilled in the art that it is not so limited, but is susceptible to various changes without departing from the scope of the invention.

We claim:

1. A laptop computer, comprising:
    a substantially horizontal base having a front end, a rear end, and two lateral side edges;
    a lid having a display monitor and pivotally mounted adjacent to the rear end of the base, the lid having an open position wherein it is pivoted away from the base, and a closed position wherein it is located adjacent to and faces the base;
    a keyboard mounted to the base and having a front end, a rear end, and left and right portions that are spaced apart from each other, each of the keyboard portions having a plurality of keys;
    a triangular array of function keys mounted to the base and located between the rear end of the keyboard and the rear end of the base; and wherein
    the keyboard portions are skewed relative to each other when the lid is in both the open and closed positions.

2. A laptop computer, comprising:
    a substantially horizontal base having a front end, a rear end, two lateral side edges, and a centerline extending from the rear end to the front end;
    a lid having a display monitor and pivotally mounted adjacent to the rear end of the base, the lid having an open position wherein it is pivoted away from the base, and a closed position wherein it is located adjacent to and faces the base;
    a keyboard mounted to the base and having a front end, a rear end, and left and right portions that are spaced apart from each other, each of the keyboard portions having a plurality of keys and extending beyond the lateral side edges of the base when the lid is in both the open and closed positions, wherein each of the keyboard portions is symmetrically skewed an acute angle relative to the centerline of the base; and
    a triangular shaped speaker on each lateral side of the lid.

3. A laptop computer, comprising:
    a substantially horizontal base having a front end, a rear end, two lateral side edges, and a centerline extending from the rear end to the front end;
    a lid having a display monitor and pivotally mounted adjacent to the rear end of the base, the lid having an open position wherein it is pivoted away from the base, and a closed position wherein it is located adjacent to and faces the base;
    a keyboard mounted to the base and having a front end, a rear end, and left and right portions that are spaced apart from each other, each of the keyboard portions having a plurality of keys and extending beyond the lateral side edges of the base when the lid is in both the open and closed positions, wherein each of the keyboard portions is symmetrically skewed an acute angle relative to the centerline of the base; and
    a triangular array of function keys mounted to the base and located between the rear end of the keyboard and the rear end of the base.

4. A laptop computer, comprising:
    a substantially horizontal base having a front end, a rear end, two lateral side edges, and a centerline extending from the rear end to the front end;
    a lid having a display monitor and pivotally mounted adjacent to the rear end of the base, the lid having an open position wherein it is pivoted away from the base, and a closed position wherein it is located adjacent to and faces the base;
    a keyboard mounted to the base and having a front end, a rear end, and left and right portions that are spaced apart from each other, each of the keyboard portions having a plurality of keys and extending beyond the lateral side edges of the base when the lid is in the open position, wherein each of the keyboard portions is symmetrically skewed an acute angle relative to the centerline of the base;
    a triangular array of function keys mounted to the base and located between the rear end of the keyboard and the rear end of the base; and
    a pair of touch pads mounted to the base between the keyboard portions, wherein a first one of said touch pads has a different degree of sensitivity for controlling a cursor on the monitor than that of a second one of said touch pads.

5. The laptop computer of claim 4, further comprising a track point mounted adjacent to the rear end of the keyboard between the keyboard portions for controlling a cursor.

6. The laptop computer of claim 4, further comprising a track ball mounted adjacent to the rear end of the keyboard between the keyboard portions for controlling a cursor.

7. The laptop computer of claim 4 wherein the keys on each of the keyboard portions are arranged in a curvilinear formation.

8. The laptop computer of claim 4, further comprising a triangular shaped speaker on each lateral side of the lid.

9. The laptop computer of claim 4 wherein the base and the lid have congruent shapes when the lid is in both the open and closed positions.

* * * * *